(12) United States Patent
Moen et al.

(10) Patent No.: US 12,297,957 B2
(45) Date of Patent: May 13, 2025

(54) LUBRICATING TUBES, SYSTEMS, AND METHODS

(71) Applicant: Castrol Limited, Reading (GB)

(72) Inventors: Richard Allen Moen, White Cloud, MI (US); William Thomas Preble, White Cloud, MI (US); Scott Alan Johnson, White Cloud, MI (US); Brady James Ward, White Cloud, MI (US)

(73) Assignee: LUBECON USA, LLC

( * ) Notice: Subject to any disclaimer, the term of this patent is extended or adjusted under 35 U.S.C. 154(b) by 13 days.

(21) Appl. No.: 17/636,354

(22) PCT Filed: Aug. 18, 2020

(86) PCT No.: PCT/US2020/046869
§ 371 (c)(1),
(2) Date: Feb. 17, 2022

(87) PCT Pub. No.: WO2021/034868
PCT Pub. Date: Feb. 25, 2021

(65) Prior Publication Data
US 2022/0290807 A1    Sep. 15, 2022

Related U.S. Application Data

(60) Provisional application No. 62/889,005, filed on Aug. 19, 2019.

(51) Int. Cl.
*F16N 21/00* (2006.01)
*B66B 7/12* (2006.01)
(Continued)

(52) U.S. Cl.
CPC ............. *F16N 21/00* (2013.01); *F16H 57/05* (2013.01); *F16N 7/38* (2013.01); *B66B 7/1261* (2013.01);
(Continued)

(58) Field of Classification Search
CPC ........ F16N 21/00; F16N 7/38; F16N 2210/33; F16N 2230/02; F16N 7/385; F16H 7/05; F16H 57/05; B66B 7/1261; B66B 31/00
(Continued)

(56) References Cited

U.S. PATENT DOCUMENTS 1,938,506 A    12/1933  Milton
2,546,211 A *  3/1951  Blackburn .............. F16H 57/05
                                                        184/15.1
(Continued)

FOREIGN PATENT DOCUMENTS

DE    10 2013 213137 A1    1/2015
GB    2 331 561 A           5/1999

OTHER PUBLICATIONS

Castrol "Escalator Maintenance Solutions" Brochure (Oct. 2017).

*Primary Examiner* — Michael R Mansen
*Assistant Examiner* — Mark K Buse
(74) *Attorney, Agent, or Firm* — Foster Swift Collins & Smith P.C.

(57) ABSTRACT

A lubricating tube and a lubrication system are configured to lubricate an apparatus having a rolling component. The lubrication system includes a fluid reservoir containing a fluid, a fluid line coupled to the fluid reservoir; and the lubricating tube, which is disposed between the fluid line and the rolling component. The lubricating tube includes a rigid cylindrical body surrounding a cavity and having an outer circumferential surface. An inlet of the lubricating tube is coupled to the fluid line and provides fluid communication between the fluid line and the cavity. A plurality of ports is disposed on the outer circumferential surface and is configured to dispense the fluid to the rolling component. A location of each port of the plurality of ports from the inlet is customizable.

20 Claims, 6 Drawing Sheets

(51) Int. Cl.
*F16H 57/05* (2006.01)
*F16N 7/38* (2006.01)
*B66B 31/00* (2006.01)

(52) U.S. Cl.
CPC ........... *B66B 31/00* (2013.01); *F16N 2210/33* (2013.01); *F16N 2230/02* (2013.01)

(58) Field of Classification Search
USPC .......................................................... 184/6
See application file for complete search history.

(56) References Cited

U.S. PATENT DOCUMENTS

| | | | | |
|---|---|---|---|---|
| 3,458,010 | A * | 7/1969 | Smithyman | F16N 25/04 184/6 |
| 5,269,614 | A * | 12/1993 | Taylor | B62J 31/00 401/9 |
| 6,065,693 | A * | 5/2000 | Lukas | B05B 1/202 239/548 |
| 8,544,608 | B2 * | 10/2013 | Vervaet | B21B 27/10 184/6.26 |
| 8,672,097 | B2 * | 3/2014 | Yagasaki | F16H 57/0489 184/15.1 |
| 9,810,310 | B2 * | 11/2017 | McLauchlan | F16H 57/0421 |
| 10,358,152 | B2 * | 7/2019 | Dyavanapalli | B61K 3/00 |
| 2009/0050090 | A1 * | 2/2009 | Kuo | F01M 9/102 123/90.34 |
| 2011/0183792 | A1 * | 7/2011 | Yagasaki | F16H 57/0456 474/43 |

* cited by examiner

LUBRICATING TUBES, SYSTEMS, AND METHODS

CROSS-REFERENCE TO RELATED APPLICATION

This application is a National Phase application of, and claims the benefit of, International (PCT) Application No. PCT/US2020/046869, filed Aug. 18, 2020, which claims priority to U.S. Provisional Application No. 62/889,005, filed Aug. 19, 2019, each of which is hereby incorporated by reference in its entirety.

BACKGROUND

Power transmission drives can be used to transmit power from a power source to machinery that uses the power, such as from an engine to a pump, or can be used to convey moving parts, such as escalators or elevators. Various different power transmission drives use lubrication to reduce wear and continue operation. For example, chains, gears, and wire ropes may be coated with a lubricant to prevent wear as the parts of these rolling components rub against one another or come into contact with other parts, such as cogs and pulleys.

With certain equipment it may be advantageous to continuously or periodically supply lubricant to the rolling components. In some instances, a lubricant may be provided to the rolling components through a lubricating tube. The lubricating tube includes orifices and ejections of lubricant are provided to lubrication points through the orifices. Such lubricating systems are effective, but proper installation can only be completed by trained experts, and the process to correctly form and position the precision orifices is difficult and time consuming.

OVERVIEW

Disclosed herein are lubricating tubes, lubricating systems, and methods for providing fluid to an apparatus including a rolling component. Beneficially, the lubricating tube includes ports for delivering the fluid, and the location of the ports on the lubricating tube is customizable without extensive training or complicated tools.

Thus, in a first aspect, the present disclosure provides a lubrication system for an apparatus including a rolling component, the lubrication system comprising:
  a fluid reservoir containing a fluid;
  a fluid line coupled to the fluid reservoir; and
  a lubricating tube disposed between the fluid line and the rolling component, the lubricating tube comprising:
    a rigid cylindrical body surrounding a cavity and having an outer circumferential surface,
    an inlet coupled to the fluid line and providing fluid communication between the fluid line and the cavity, and
    a plurality of ports disposed on the outer circumferential surface and configured to dispense the fluid to the rolling component, wherein a location of each port of the plurality of ports from the inlet is customizable.

In an embodiment, the lubricating tube further comprises a plurality of holes disposed along the outer circumferential surface, wherein each hole of the plurality of holes extends from the outer circumferential surface toward the cavity, wherein the plurality of holes comprise:
  a plurality of blind holes extending from the outer circumferential surface to a closed end, and
  the plurality of ports, wherein each port of the plurality of ports is defined by one hole of the plurality of holes, and wherein each port of the plurality of ports extends from the outer circumferential surface to the cavity.

In an embodiment, the lubricating tube further comprises a plurality of spacer portions and a plurality of dispenser portions, and wherein each dispenser portion of the plurality of dispenser portions comprises one port of the plurality of ports.

In another aspect the disclosure provides a lubrication system for an apparatus including a rolling component, the lubrication system comprising:
  a fluid reservoir containing a fluid;
  a fluid line coupled to the fluid reservoir; and
  a lubricating tube disposed between the fluid line and the rolling component, the lubricating tube comprising:
    a rigid cylindrical body surrounding a cavity and having an outer circumferential surface,
    an inlet coupled to the fluid line and providing fluid communication between the fluid line and the cavity, and
    a plurality of holes disposed along the outer circumferential surface, wherein each hole extends from the outer circumferential surface toward the cavity, and wherein the plurality of holes comprise:
      a plurality of blind holes extending from the outer circumferential surface to a closed end, and
      a plurality of ports extending from the outer circumferential surface to the cavity, wherein each port of the plurality of ports is configured to dispense the fluid to the rolling component.

In an embodiment, each port of the plurality of ports is defined by one hole of the plurality of holes by boring the respective hole to the cavity.

In an embodiment, at least one of the respective holes is bored to the cavity before the lubricating tube is disposed between the fluid line and the chain.

In an embodiment, the rolling component comprises a plurality of lubrication points, and wherein each port of the plurality of ports faces one lubrication point of the plurality of lubrication points.

In an embodiment, each hole of the plurality of holes is spaced apart from other holes of the plurality of holes on the outer circumferential surface by a substantially same distance.

In an embodiment, the plurality of ports is less than the plurality of blind holes.

In an embodiment, the plurality of ports comprises four ports.

In an embodiment, the plurality of holes comprises a range of eighty to one hundred holes.

In an embodiment, the lubricating tube further comprises a first end and a second end, and wherein the inlet is disposed at the first end.

In an embodiment, the apparatus comprises an escalator.
In an embodiment, the apparatus comprises an elevator.
In an embodiment, the rolling component comprises a chain.
In an embodiment, the rolling component comprises a wire rope.

In another aspect, the disclosure provides a lubricating tube for a lubrication system including a fluid reservoir, wherein the fluid reservoir contains a fluid, and a fluid line coupled to the fluid reservoir, the lubricating tube comprising:
  a rigid cylindrical body surrounding a cavity and having an outer circumferential surface;

an inlet configured to be coupled to the fluid line and configured to provide fluid communication between the fluid line and the cavity; and a plurality of blind holes disposed along the outer circumferential surface, wherein each blind hole of the plurality of holes extends from the outer circumferential surface toward the cavity, wherein each blind hole of the plurality of blind holes includes an opening at the outer circumferential surface and a closed end spaced from the cavity, wherein the plurality of blind holes is configured to define a plurality of ports that extend to the cavity, and wherein each port of the plurality of ports is configured to dispense the fluid to a rolling component.

In another aspect, the disclosure provides a method of lubricating an apparatus including a rolling component using a lubricating tube, wherein the lubricating tube includes a rigid cylindrical body surrounding a cavity and having an outer circumferential surface, an inlet, and a plurality of blind holes disposed along the outer circumferential surface, wherein each blind hole of the plurality of blind holes extends from the outer circumferential surface toward the cavity, the method comprising:

determining lubrication points of the rolling component;

selecting a group of blind holes of the plurality of blind holes;

defining a plurality of ports by forming a respective opening between each selected blind hole of the group of blind holes and the cavity such that each port of the plurality of ports extends from the outer circumference to the cavity;

dispensing, using the plurality of ports, a fluid to the rolling component, wherein the lubricating tube is disposed between the rolling component and a fluid line, wherein the inlet is coupled to the fluid line and provides fluid communication between the fluid line and the cavity, and wherein the fluid line is coupled to a fluid reservoir containing the fluid.

In an embodiment, each port of the plurality of ports is defined by boring the opening between the respective blind hole to and the cavity.

In an embodiment, each port of the plurality of ports faces one of the determined lubrication points.

In an embodiment, the method further comprises, before dispensing the fluid to the rolling component, cutting the lubricating tube to a selected length.

These as well as other aspects, advantages, and alternatives, will become apparent to those of ordinary skill in the art by reading the following detailed description.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

Example systems and methods are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. In the following detailed description, reference is made to the accompanying figures, which form a part thereof. In the figures, similar symbols typically identify similar components, unless context dictates otherwise. Other embodiments may be utilized, and other changes may be made, without departing from the scope of the subject matter presented herein.

The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

As used herein, with respect to measurements, "about" means +/−5%.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one embodiment" or "one example" means that one or more feature, structure, or characteristic described in connection with the example is included in at least one implementation. The phrases "one embodiment" or "one example" in various places in the specification may or may not be referring to the same example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Figure 1:
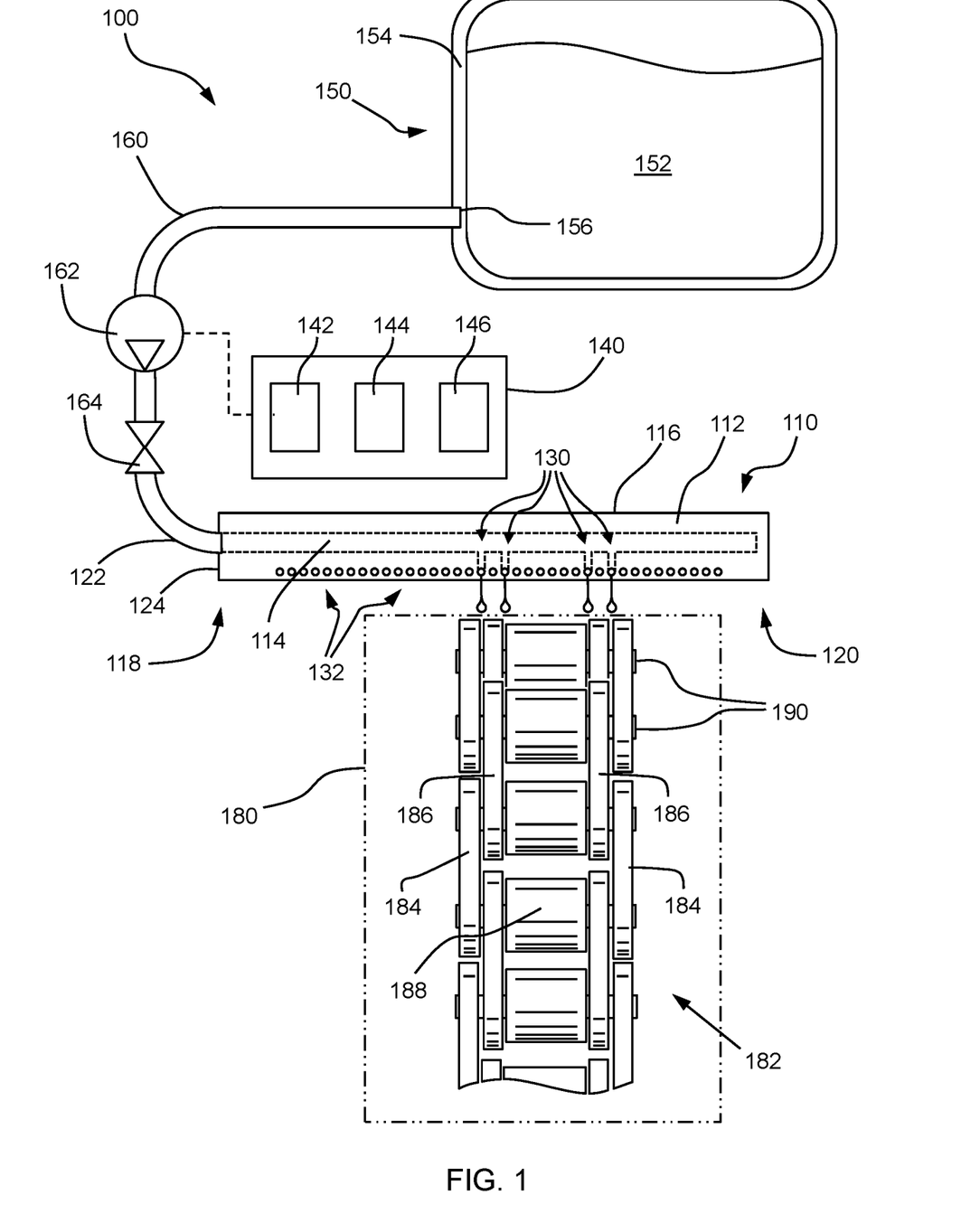
FIG. 1 is a schematic view of a lubrication system for an apparatus including a rolling component according to an example embodiment of the disclosure.

FIG. 1 schematically illustrates an example embodiment of a lubrication system 100 for an apparatus 180 including a rolling component 182. The lubrication system 100 includes a reservoir 150, a fluid line 160, and a lubricating tube 110 disposed between the fluid line 160 and the rolling component 180. During operation, fluid from the reservoir 150 is delivered to the lubricating tube 110 via the fluid line 160, and is ejected from the lubricating tube 110 onto the rolling component 182 of the apparatus 180.

The lubricating tube 110 may include a rigid cylindrical body 112 that surrounds a cavity 114. Further, the cylindrical body 112 may have an outer circumferential surface 116 that extends from a first end 118 to a second end 120 of the lubricating tube 110. The term rigid, as used herein, may include lubricating tubes that can bend no more than 10 degrees without breaking or plastically deforming. Further, in some embodiments, the rigid cylindrical body may be constructed from a material such that the lubricating tube 110 will not bend more than 1 degree under its own weight. In some embodiments, the cylindrical body 112 of the lubricating tube may be formed of metal, such as, for example, steel or an aluminum alloy. In other embodiments, the cylindrical body 112 may be formed of a plastic. Other materials are also possible, such as a ceramic material or a glass.

In some embodiments, the rigid cylindrical body 112 of the lubricating tube 110 may have a circular cross section. In other embodiments, the cross section of the cylindrical body 112 may have another shape, such as a square with rounded corners or another polygonal shape. Further, in some embodiments, the cross section of the cylindrical body 112 may be elliptical. Still, in other embodiments, the cross section of the cylindrical body 112 may include both straight and rounded portions. For example, in some embodiments, the cylindrical body 112 may have a cross section that is mostly circular but includes one or more straight edges. Thus, the term cylindrical, as used herein, is not limited to circular cylinders and includes cylindrical shapes having other cross section. Further, while in some embodiments, the cross section of the cylindrical body 112 may be uniform, or substantially uniform, along its length, in other embodiments, the cross section is not uniform along its length. Indeed, in some embodiments, some variation in the shape of the cross section is possible along the length of the cylindrical body.

The lubricating tube 110 may include an inlet 122 that is coupled to the fluid line 160 and provides fluid communication between the fluid line 160 and the cavity 114 of the cylindrical body 112. Thus, fluid from the reservoir 150 can be delivered to the cavity 114 in the lubricating tube 110 through the fluid line 160. In some embodiments, the inlet 122 of the lubricating tube 110 is disposed at the first end 118 of the lubricating tube 110. Indeed, in some embodiments, the inlet 122 may extend through an end wall 124 of the lubricating tube 110 at the first end 118. In other embodiments, the inlet 122 may extend through the outer circumferential surface 116 of the cylindrical body 112 at the first end 118. Still, in other embodiments, the inlet 122 may extend through the outer circumferential surface 116 of the cylindrical body 112 somewhere toward the center of the lubricating tube 110, or in another location.

The lubricating tube 110 may also include a plurality of ports 130 disposed on the outer circumferential surface 116 of the cylindrical body 112. Each of the ports 130 may extend from the outer circumferential surface 116 to the cavity 114 so as to provide a fluid path out of the cavity 114 for fluid from the reservoir 150. The location of each port 130 from the inlet 122 may be customizable so as to permit the delivery of fluid at a precise position. For example, in some embodiments, as explained in more detail below, the lubricating tube may include a plurality of blind holes that are configured to selectively define the ports 130 of the lubricating tube 110. In other embodiments, as also explained in more detail below, the lubricating tube may be formed from a plurality of spacer portions and dispenser portions that are ordered in a particular manner to position the ports in specific desired locations.

In some embodiments, the reservoir 150 may be formed by a fluid container 152 with an outer container wall 154. Further the fluid container 152 may include an outlet 156 that is in fluid communication with the fluid line 160 that leads to the lubricating tube 110. While in some embodiments the reservoir 150 may be formed by a single fluid container 152, in other embodiments, the reservoir 150 may be formed by several tanks or other containers that are interconnected.

In some embodiments, the reservoir 150 may house the fluid that is delivered by the lubricating tube 110 to the rolling component 182 of the apparatus 180. The fluid in the reservoir 150 may take a variety of different forms, including oil-based or synthetic lubricants.

The fluid line 160 may have a variety of different constructions. In some embodiments, the fluid line 160 is formed by one or more sections of flexible tubing or hose, and may be formed from a variety of different materials, including metal, rubber, silicone, or other polymer materials. For example, in some embodiments, the fluid line includes nylon tubing. In other embodiments, the fluid line includes steel tubing. Still, in other embodiments, the fluid line 160 may be formed by one or more sections of pipe.

In some embodiments, a pump 162 may be disposed in the fluid line 160 so as to drive fluid from the reservoir 150 to the lubricating tube 110 and out through the plurality of ports 130. The term pump, as will be understood by those of ordinary skill in the art, includes a device that uses energy to move a fluid. For example, the pump 162 can be formed by any actuator or mechanism that moves fluid, such as a gear pump, trochoid pump, or vane pump.

In some embodiments, a valve 164 may be disposed in the fluid line 160 so as to control the flow of fluid from the reservoir 150 to the lubricating tube 110. For example, a two-way solenoid valve 164 may be used to open and close the fluid line 160. The use of such a solenoid valve 164 allows precise control of fluid flow through the fluid line 160, for example, so that the fluid can be ejected from the lubricating tube 110 in timed pulses.

In some embodiments, operation of the pump 162 and/or valve 164 may be driven by a controller 140 in order to direct the expulsion of fluid from the lubricating tube 110. The controller 140 may be configured to drive the pump 162 and/or valve 164 according to a variety of different operating schemes. For example, in some embodiments, the controller 140 operates to eject fluid from the lubricating tube 110 at a certain defined time intervals. In other embodiments, the controller 140 may be configured to drive the pump 162 and/or valve 164 according to the position of the rolling component 182 or another part of the apparatus 180. For example, in some embodiments the controller 140 may be configured to eject fluid based on data from a positional sensor, such as a proximity sensor, a limit switch, or an optical sensor. In other embodiments, the controller 140 may receive information from a camera indicative of the position of the rolling component 182 or another part of the apparatus. Still in other embodiments, the controller 140 may be configured to eject fluid according to operating parameters of the apparatus 180. For example, if the power required to drive the rolling component 182 increases, the controller 140 may determine that additional lubricant is required, and increase the frequency or quantity of fluid being delivered to the rolling component 182.

A schematic depiction of the controller 140 is shown in FIG. 1. The controller 140 may include a non-transitory computer-readable medium with program instructions stored thereon for operating the pump and other components of the lubrication system. In some embodiments, the controller 140 may include at least one memory 142, at least one processor 144, and/or a network interface 146. Additionally or alternatively, in other embodiments, the controller 140 may include a different type of computing device operable to carry out the program instructions. For example, in some embodiments, the controller may include an application-specific integrated circuit (ASIC) that performs processor operations, or a field-programmable gate array (FPGA).

While the controller 140 of the lubrication system 100 may be included in a single unit and/or provided in a distinct housing, as shown in FIG. 1, in other embodiments, at least some portion of the controller 140 may be separate from the housing. For example, in some embodiments, one or more parts of the controller 140 may be part of a smartphone, tablet, notebook computer, or wearable device. Further, in some embodiments, the controller 140 may be a client device, i.e., a device actively operated by the user, while in other embodiments, the controller 140 may be a server device, e.g., a device that provides computational services to a client device. Moreover, other types of computational platforms are also possible in embodiments of the disclosure.

The memory 142 may be a computer-usable memory, such as random access memory (RAM), read-only memory (ROM), non-volatile memory such as flash memory, a solid state drive, a hard-disk drive, an optical memory device, and/or a magnetic storage device.

The processor 144 of the controller 140 may include computer processing elements, e.g., a central processing unit (CPU), a digital signal processor (DSP), or a network processor. In some embodiments, the processor 144 may include register memory that temporarily stores instructions being executed and corresponding data and/or cache memory that temporarily stores performed instructions. In certain embodiments, the memory 142 stores program instructions that are executable by the processor 144 for carrying out the methods and operations of the disclosure, as described herein.

The network interface 146 may provide a communications medium, such as, but not limited to, a digital and/or an analog communication medium, between the controller 140 and other computing systems or devices. In some embodiments, the network interface may operate via a wireless connection, such as IEEE 802.11 or BLUETOOTH, while in other embodiments, the network interface 146 may operate via a physical wired connection, such as an Ethernet connection. Still in other embodiments, the network interface 146 may communicate using another convention. In some embodiments, the network interface 146 may be operable to receive information from other components that are used by the controller 140 to operate. For example, the network interface 146 may be configured to receive information from sensors that are indicative of the operating status of the lubrication system. As another example, the network interface 146 may be configured to receive new operating instructions or software updates.

In some embodiments, the rolling component 182 of apparatus 180 is a roller chain. The roller chain 182 may include outer links 184, inner links 186, and rollers 188. The roller chain 182 may be held together by pins 190, where each of the outer links 184 and the inner links 186 are coupled to two of the pins 190. To form the roller chain, the outer links 184 and inner links 186 may attach to alternating pairs of the pins 190 so as to form a continuous sequence. In some embodiments, a sequence of outer links 184 and inner links 186 is disposed on both sides of the rollers 188. Further, in some embodiments, a bushing may be included between the pin 190 and the roller 188. Other chain configurations are also possible. For example, embodiments of chains may include a single sequence of inner links and outer links. Likewise, in some embodiments, the chain may not include any rollers.

In some embodiments, the rolling component 182 may have another configuration. For example, in some embodiments, the rolling component 182 may be a wire rope. The term wire rope, as used herein, may include ropes of metal wire and may or may not include strands of other materials, such as aramid. Still, in other embodiments, the rolling component 182 may have another configuration, such as a set of gears, or a belt.

In some embodiments, the apparatus 180 may be an escalator. In such embodiments, the rolling component 182 may be used, for example, to convey the stairs or to convey the handrail. In other embodiments, the apparatus 180 may be an elevator, and the rolling component 182 may be used to convey the elevator car or weights, for example.

Figure 2:
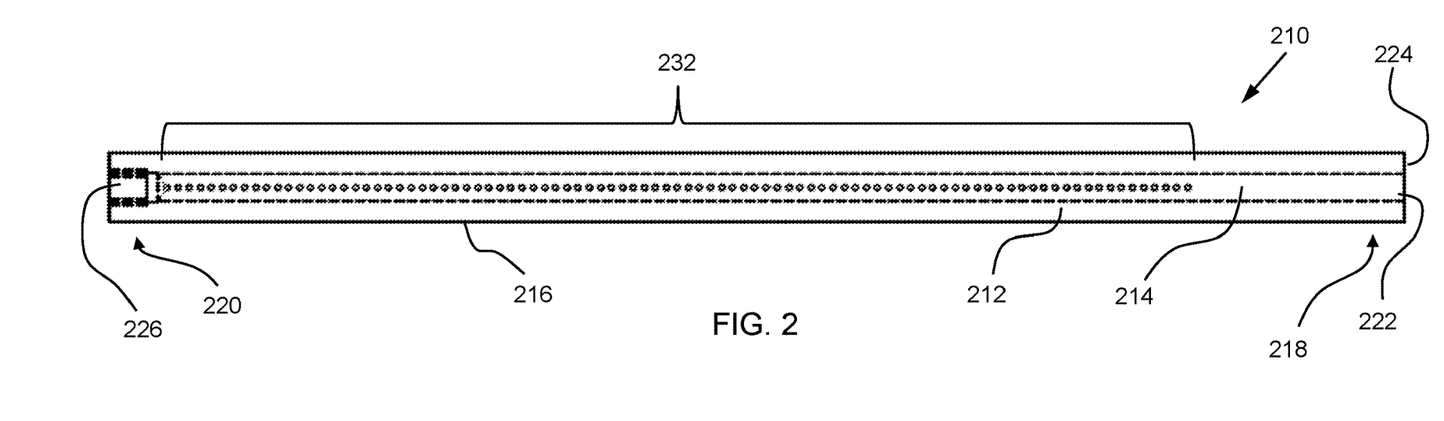
FIG. 2 is a schematic top view of a lubricating tube according to an example embodiment of the disclosure.
Figure 3:
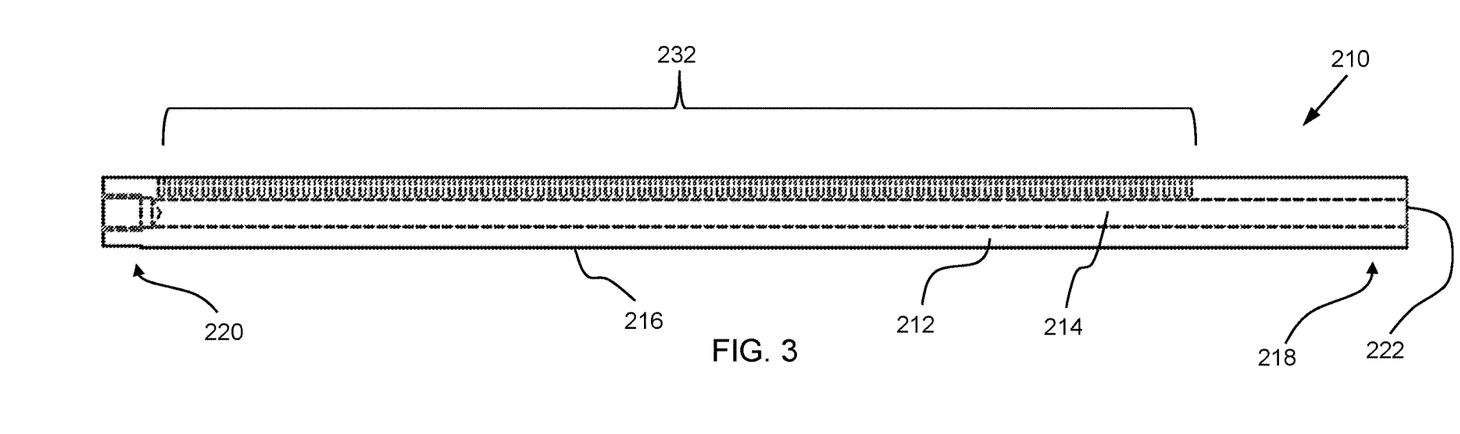
FIG. 3 is a schematic side view of the lubricating tube of FIG. 2.

FIGS. 2 and 3 show an embodiment of a lubricating tube 210 according to an example embodiment. The lubricating tube 210 includes a rigid cylindrical body 212 that surrounds a cavity 214 and has an outer circumferential surface 216. The lubricating tube 210 also includes a first end 218 and a second end 220 opposite the first end 218. The lubricating tube 210 may also include an inlet 222 that is configured to be coupled to a fluid line, where the inlet 222 is in fluid communication with the cavity 214. In some embodiments, the inlet 222 may extend through an end wall 224 of the lubricating tube 210. In other embodiments, the inlet 222 may be positioned in another location, as explained above with respect to lubricating tube 110. In some embodiments, the second end 220 may include a plug 226 or an end cap, such that lubricating tube 210 is closed at the second end. In other embodiments, the second end 220 may include an opening and be connected to another component, such as another lubricating tube or another fluid line.

The lubricating tube 210 may include a plurality of holes 232 disposed along the length of the outer circumferential surface 216. Each of the holes 232 may be originally formed as blind holes, and a select group of the holes 232 may be converted into ports, as explained in more detail below. In some embodiments, each of the holes 232 may be spaced apart from other holes along the outer circumference 216 by substantially the same distance. In other words, in some embodiments, the distance between each hole 232 and one or more neighboring holes is substantially the same along the length of the lubricating tube. The term "substantially the same distance" as used in this disclosure, means exactly equal or one or more deviations from exactly equal (e.g., +/−10%).

In some embodiments, the holes 232 may extend in a straight line across the length of the lubricating tube 210, as shown in FIGS. 2 and 3. In other embodiments, the holes 232 may be offset from one another. For example, in some embodiments, the holes may be formed in two or more rows along the length of the lubricating tube 210, with alternate positioning. Such a configuration can permit a higher density of holes along the length of the tube, allowing more precise lateral positioning of the selected holes.

The lubricating tube 210 can include various different numbers of holes. For example, in some embodiments, the lubricating tube 210 can include between 80 and 100 holes. The lubricating tube 210, as shown in FIGS. 2 and 3, includes 93 holes. Lubricating tubes with fewer than 80 holes and lubricating tubes with greater than 100 holes are also possible.

The holes 232 may be any of a variety of sizes. In some embodiments, the holes 232 may have a diameter in a range from 0.01 inches to 0.1 inches. For example, in some embodiments, the holes 232 have a diameter in a range from 0.03 to 0.06 inches. The size of the holes can be selected based on various factors. For example, holes 232 of a larger diameter can be used to form ports of a larger diameter, which will more easily eject fluid having a higher viscosity. In some embodiments, all of the holes have substantially the same size. In other embodiments, the lubricating tube 210 may include holes having a various different sizes. For example, in some embodiments, the lubricating tube 210 may include several rows of different sized holes 232, which allows the size of the ports to be selected at the time of installation. For example, the lubricating tube 210 may include a first row of holes 232 of a first diameter that run along the length of the lubricating tube 210, and a second row of holes 232 of a larger diameter that run along the length of the lubricating tube 210 parallel to the first row. Additional rows may also be included. In such an embodiment, the installer may select a desired port diameter and use the holes 232 with the desired diameter to form the ports.

In some embodiments, the lubricating tube 210 may have a length in a range of 4 inches to 1 foot in length, for example a length in a range of 6 to 8 inches. Further, in some embodiments the lubricating tube 210 can be cut to a desired length based on the other components of the corresponding lubrication system.

Figure 4:
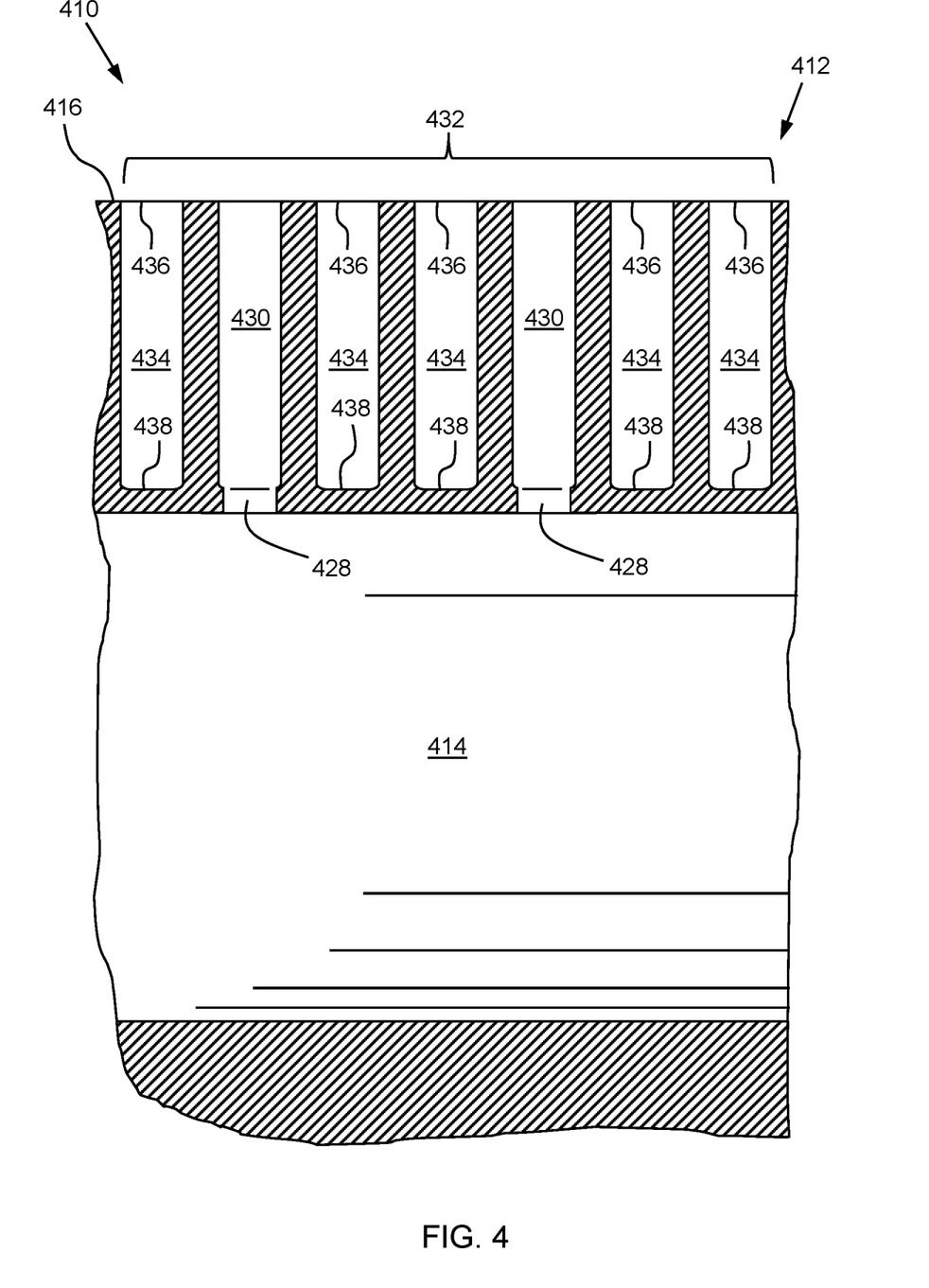
FIG. 4 is a detailed schematic cross-sectional side view of the lubricating tube of FIG. 2.

FIG. 4 shows a detailed cross-sectional side view of a portion of a lubricating tube 410 according to an example embodiment. Lubricating tube 410 includes a rigid cylindrical body 412 that surrounds a cavity 414 and has an outer circumferential surface 416. Disposed along the outer circumferential surface 416 is a plurality of holes 432 that extend toward the cavity 414. A number of the holes 432 are blind holes 434 and include an opening 436 at the outer circumferential surface 416 and a closed end 438 that is spaced from the cavity 414. In some embodiments, the blind holes 434 may be formed by boring the hole into the outer circumferential surface 416 until the hole is spaced a desired distance from the cavity 414, such that the material of the cylindrical body 412 forms the closed end 438 of the blind holes 434. In other embodiments, the blind holes 434 may be initially formed as through holes that are subsequently sealed with a plug that forms the closed end 438.

A group of the holes 432 may also define ports 430 that extend from the outer circumferential surface 416 to the cavity 414. Accordingly, fluid within the cavity 414 can be delivered from the cavity 414 of the lubricating tube 410 to an external component, such as a rolling component. In some embodiments, each of the ports 430 was previously configured as a blind hole that was then converted into the port. For example, in some embodiments, a group of the holes 432 that were originally blind holes may be selected for conversion into ports 430. These selected holes 432 can then be converted from blind holes into ports by forming an opening 428 that extends to the cavity 414. Thus, each of the ports 430 is defined by one of the holes 432 along the length of the outer circumferential surface 416. Each of the openings 428 may be formed by boring the closed end of a blind hole to provide access to the cavity 414. Boring the opening 428 to form the ports 430 can be carried out using various methods, such as drilling or punching the opening 428 through the material at the closed end of the blind hole.

In some embodiments, only a portion of the blind holes 434 are converted into ports 430 by forming the respective opening 428 to the cavity 414. This allows an installer to choose the location where the port 430 will be formed from a number of different options. Indeed, in some embodiments, the number of ports 430 is less than the number of blind holes 432 after the lubricating tube 410 has been completed and installed. Moreover, in some embodiments, the number of ports 430 is no more than 25% of the number of holes 432. Further, in some embodiments, the number of ports 430 is no more than 10% of the number of holes 432. By having a larger number of holes 432 than ports 430, the location of the ports 430 can be carefully selected to an appropriate location along the length of the outer circumferential surface 416.

For example, in lubrication system 100, shown in FIG. 1, the lubricating tube 110 includes a large number of holes 132, only four of which are converted into ports 130. Accordingly, the position of the ports 130 can be selected from the holes 132 in order to align with lubrication points on the rolling component 180. For example, the ports 130 may be selected from certain holes 132 in order to align the location where lubricant is delivered with lubrication points that correspond to gaps between the outer links 184 and the inner links 186 as well as gaps between the inner links 186 and the rollers 188. For example, lubricating tube 110, as shown in FIG. 1, includes four ports 130, two of which are aligned with either side of the rollers 188, and two of which are aligned with the gaps between the outer links 184 and the inner links 186 on each side of the rollers 180. In other embodiments, the lubricating tube 110 may include another number of ports 130. For example, in some embodiments, the lubricating tube 110 may include a range of two to eight ports 130, and some embodiments include more than eight ports 130.

Figure 5:
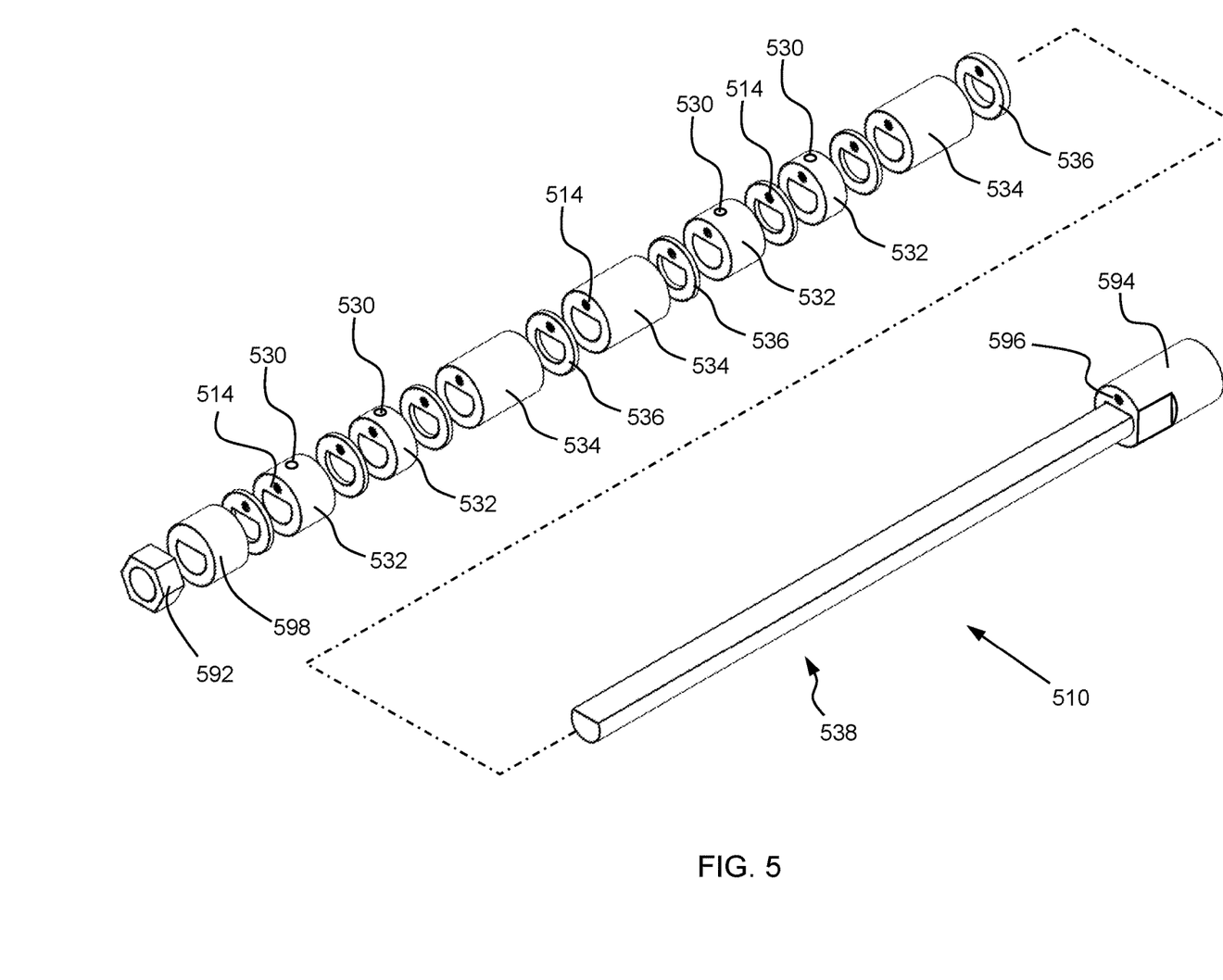
FIG. 5 is a schematic exploded perspective view of a lubricating tube according to another example embodiment of the disclosure.
Figure 6:
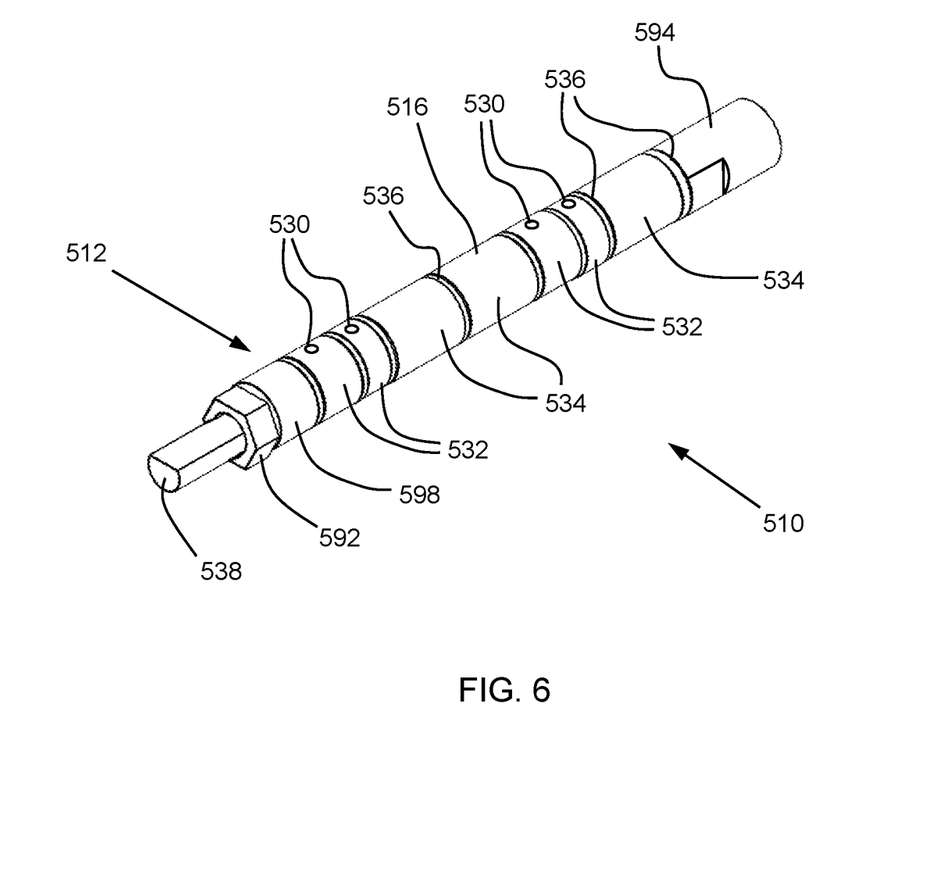
FIG. 6 is a schematic assembled perspective view of the lubricating tube according to FIG. 5.

FIGS. 5 and 6 show another lubricating tube 510 according to an example embodiment. The lubricating tube 510 is shown in an exploded configuration in FIG. 5 and in an assembled configuration in FIG. 6. The lubricating tube 510 may be assembled from a plurality of different portions 532, 534 that collectively form a cylindrical body 512 having an outer circumferential surface 516 (see FIG. 6). Each of the different portions 532, 534 may include an orifice 514 extending therethrough, where the orifices 514 are aligned during assembly so as to form a cavity that runs along the length of the lubricating tube 510. The different portions of the lubrication tube 510 may include dispenser portions 532 that include ports 530 disposed along the outer circumferential surface 516. The ports 530 may extend into the dispenser portions 532 so as to be connected to the respective orifice 514 and thus be in fluid communication with the cavity of the lubricating tube 510.

The portions of the lubricating tube 510 may also include spacer portions 534 that are positioned along the length of the lubricating tube 510 so as to customize the position of the ports 530 of the dispenser portions 532. For example, if the lubrication points on the rolling component are close to each other, two dispenser portions 532 may be positioned adjacent to one another. Alternatively, if the lubrication points are separated by a greater distance, the dispenser portions 532 can be separated by one or more spacer portion 534.

In some embodiments, the lubricating tube 510 may also include gaskets 536 disposed between adjacent dispenser portions 532 and/or spacer portions 534. The gaskets 536 may include orifices 514 in order to avoid blocking the flow of fluid through the cavity of the lubricating tube 510. Further, the gaskets 536 can provide a seal between the adjacent dispenser portions 532 and/or spacer portions 534 along the length of the lubricating tube 510 to prevent leaking between portions.

In some embodiments, the dispenser portions 532 and spacer portions 534 are disposed on a central bar 538 that holds the lubricating tube 510 together. The central bar 538 may include a key or other asymmetrical cross section to prevent rotation of the dispenser portions 532 and spacer portions 534 along the length of the lubricating tube 510. The dispenser portions 532 and spacer portions 534 can be held on the central bar 538 by a fastener. For example, the central bar 538 may be threaded and a nut 592 may be fastened onto the central bar 538 to maintain assembly of the lubricating tube 510. In other embodiments, the dispenser portions 532 and spacer portions 534 may be directly attached to one another without a central bar. For example, in some embodiments, the dispenser portions 532 and spacer portions 534 may be attached to one another with connector, such as male and female threaded sections.

In some embodiments, the lubricating tube 510 may include an inlet portion 594 including an orifice 596 that is aligned with the orifices 514 of the other portions. The inlet portion 594 may include a fluid inlet that is connected to the orifice 596 and thereby provides fluid communication to the cavity formed by the orifices 514 of the dispenser portions 532 and spacer portions 534. Likewise, the lubricating tube 510 may also include an end cap portion 598 disposed opposite the inlet portion 594. The end cap portion 598 may close off the cavity formed by the orifices in the dispenser portions 532 and spacer portions 534.

Figure 7:
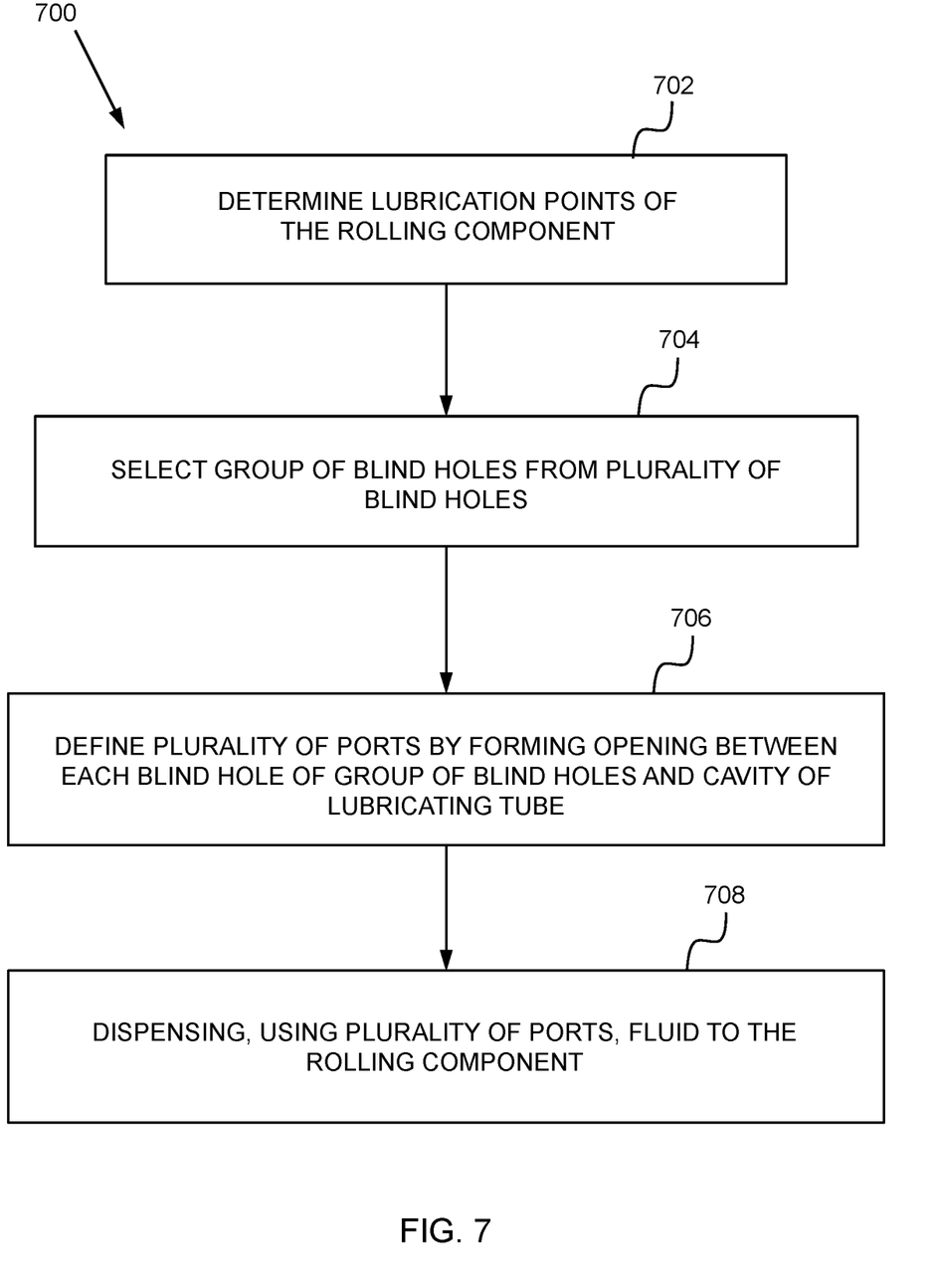
FIG. 7 is a flow chart illustrating a method according to an example embodiment of the disclosure.

FIG. 7 shows a flow chart illustrating a method 700 according to an example embodiment. More specifically, FIG. 7 illustrates a method of lubricating an apparatus including a rolling component using a lubricating tube. The lubricating tube includes a rigid cylindrical body surrounding a cavity and having an outer circumferential surface, an inlet, and a plurality of blind holes disposed along the outer circumferential surface, where each blind hole of the plurality of blind holes extends from the outer circumferential surface toward the cavity. As shown by block 702, the method 700 may involve determining lubrication points of the rolling component.

Further, the method 700 may also involve, as shown by block 704, selecting a group of blind holes from a plurality of blind holes along an outer circumferential surface of a rigid cylindrical body. As shown by block 706, the method 700 may also involve defining a plurality of ports by forming a respective opening between each selected blind hole of the group of blind holes and the cavity such that each port of the plurality of ports extends from the outer circumference to the cavity.

Further, as shown by block 708, the method 700 may further involve dispensing, using the plurality of ports, a fluid to the rolling component. For example, the lubricating tube may be disposed between the rolling component and a fluid line, where the inlet of the lubricating tube is coupled to the fluid line and provides fluid communication between the fluid line and the cavity of the lubricating tube. Further, the fluid line may be coupled to a fluid reservoir containing the fluid. For example, the fluid line may be coupled to a tank that stores a lubricant.

In some embodiments of the method of the disclosure, the fluid may be periodically ejected from the lubricating tube through each of the plurality of ports onto the rolling component. In other embodiments, the fluid may be continuously supplied to the rolling component. Supply of the fluid through the lubricating tube may be directed by a controller, such as controller 140 of lubricating system 100 shown in FIG. 1, or it may occur without the use of a controller.

In some embodiments of the method of the disclosure, the lubricating tube may be cut to a selected length. For example, the lubricating tube 110 may be cut from a longer tube so as to form the first end 118 of the lubricating tube 110 at the cut edge. Likewise, the inlet 122 of the lubricating tube 110 may be defined at the cut edge of the first end 118 of the lubricating tube 110. In some embodiments of the method of the disclosure, the lubricating tube may be cut to the selected length before dispensing the fluid to the rolling component.

In some embodiments of the method of the disclosure, each of the ports is defined by boring the opening between the respective blind hole and the cavity. The term boring, as used herein, includes the creation of a hole using a revolving tool, such as a drill, as well as the creation of a hole by piercing or punching an opening from the blind hole to the cavity.

In some embodiments of the method of the disclosure, each of the ports may face one of the predetermined lubrication points. For example, in some embodiments, the blind holes that are selected as the group of blind holes that are subsequently made open to the cavity may be blind holes that align with lubrication points of the rolling component. As an example, the blind holes selected as the group of blind holes may align with wear locations on the rolling component, such as locations where two elements of the rolling component rub against one another.

The above detailed description describes various features and functions of the disclosed systems, devices, and methods with reference to the accompanying Figures. In the Figures, similar symbols typically identify similar components, unless context dictates otherwise. The illustrative embodiments described in the detailed description, Figures, and claims are not meant to be limiting. Other embodiments can be utilized, and other changes can be made, without departing from the scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A lubrication system for an apparatus including a rolling component, the lubrication system comprising:
   a fluid reservoir containing a fluid;
   a fluid line coupled to the fluid reservoir; and
   a lubricating tube disposed between the fluid line and the rolling component, the lubricating tube comprising:
      a rigid cylindrical body surrounding a cavity and having an outer circumferential surface,
      an inlet coupled to the fluid line and providing fluid communication between the fluid line and the cavity, and
      a plurality of ports disposed on the outer circumferential surface and configured to dispense the fluid to the rolling component, wherein a location of each port of the plurality of ports from the inlet is customizable; and
   wherein the lubricating tube further comprises a plurality of holes disposed along the outer circumferential surface, wherein each hole of the plurality of holes extends from the outer circumferential surface toward the cavity, wherein the plurality of holes comprise:
      a plurality of blind holes extending from the outer circumferential surface to a closed end, and
      the plurality of ports, wherein each port of the plurality of ports is defined by one hole of the plurality of holes, and wherein each port of the plurality of ports extends from the outer circumferential surface to the cavity.

2. The lubrication system of claim 1, wherein the lubricating tube further comprises a plurality of spacer portions and a plurality of dispenser portions, and wherein each dispenser portion of the plurality of dispenser portions comprises one port of the plurality of ports.

3. A lubrication system for an apparatus including a rolling component, the lubrication system comprising:
   a fluid reservoir containing a fluid;
   a fluid line coupled to the fluid reservoir; and
   a lubricating tube disposed between the fluid line and the rolling component, the lubricating tube comprising:
      a rigid cylindrical body surrounding a cavity and having an outer circumferential surface,
      an inlet coupled to the fluid line and providing fluid communication between the fluid line and the cavity, and
      a plurality of holes disposed along the outer circumferential surface, wherein each hole extends from the outer circumferential surface toward the cavity, and wherein the plurality of holes comprise:
         a plurality of blind holes extending from the outer circumferential surface to a closed end, and
         a plurality of ports extending from the outer circumferential surface to the cavity, wherein each port of the plurality of ports is configured to dispense the fluid to the rolling component.

4. The lubrication system of claim 3, wherein each port of the plurality of ports is defined by one hole of the plurality of holes by boring the respective hole to the cavity.

5. The lubrication system of claim 4, wherein at least one of the respective holes is bored to the cavity before the lubricating tube is disposed between the fluid line and the chain.

6. The lubrication system of claim 3, wherein the rolling component comprises a plurality of lubrication points, and wherein each port of the plurality of ports faces one lubrication point of the plurality of lubrication points.

7. The lubrication system of claim 3, wherein each hole of the plurality of holes is spaced apart from other holes of the plurality of holes on the outer circumferential surface by a substantially same distance.

8. The lubrication system of claim 3, wherein the plurality of ports is less than the plurality of blind holes.

9. The lubrication system of claim 3, wherein the plurality of ports comprises four ports.

10. The lubrication system of claim 3, wherein the plurality of holes comprises a range of eighty to one hundred holes.

11. The lubrication system of claim 3, wherein the lubricating tube further comprises a first end and a second end, and wherein the inlet is disposed at the first end.

12. The lubrication system of claim 3, wherein the apparatus comprises an escalator.

13. The lubrication system of claim 3, wherein the apparatus comprises an elevator.

14. The lubrication system of claim 3, wherein the rolling component comprises a chain.

15. The lubrication system of claim 3, wherein the rolling component comprises a wire rope.

16. A lubricating tube for a lubrication system including a fluid reservoir, wherein the fluid reservoir contains a fluid, and a fluid line coupled to the fluid reservoir, the lubricating tube comprising:
   a rigid cylindrical body surrounding a cavity and having an outer circumferential surface;
   an inlet configured to be coupled to the fluid line and configured to provide fluid communication between the fluid line and the cavity; and
   a plurality of blind holes disposed along the outer circumferential surface, wherein each blind hole of the plurality of holes extends from the outer circumferential surface toward the cavity, wherein each blind hole of the plurality of blind holes includes an opening at the outer circumferential surface and a closed end spaced from the cavity, wherein the plurality of blind holes is configured to define a plurality of ports that extend to the cavity, and wherein each port of the plurality of ports is configured to dispense the fluid to a rolling component.

17. A method of lubricating an apparatus including a rolling component using a lubricating tube, wherein the lubricating tube includes a rigid cylindrical body surrounding a cavity and having an outer circumferential surface, an inlet, and a plurality of blind holes disposed along the outer circumferential surface, wherein each blind hole of the plurality of blind holes extends from the outer circumferential surface toward the cavity, the method comprising:
   determining lubrication points of the rolling component;
   selecting a group of blind holes of the plurality of blind holes;
   defining a plurality of ports by forming a respective opening between each selected blind hole of the group of blind holes and the cavity such that each port of the plurality of ports extends from the outer circumference to the cavity; and dispensing, using the plurality of ports, a fluid to the rolling component, wherein the lubricating tube is disposed between the rolling component and a fluid line, wherein the inlet is coupled to the fluid line and provides fluid communication between the fluid line and the cavity, and wherein the fluid line is coupled to a fluid reservoir containing the fluid.

18. The method of claim 17, wherein each port of the plurality of ports is defined by boring the opening between the respective blind hole and the cavity.

19. The method of claim 17, wherein each port of the plurality of ports faces one of the determined lubrication points.

20. The method of claim 17, further comprising, before dispensing the fluid to the rolling component, cutting the lubricating tube to a selected length.

* * * * *